(12) United States Patent
Ware et al.

(10) Patent No.: US 12,189,400 B2
(45) Date of Patent: Jan. 7, 2025

(54) AUTOMATED GUIDED VEHICLE MANAGEMENT SYSTEM AND METHOD

(71) Applicant: Delta Electronics Int'l (Singapore) Pte Ltd, Singapore (SG)

(72) Inventors: Simon Ware, Singapore (SG); Yajuan Sun, Singapore (SG); Bo Woon Jeffrey Soon, Singapore (SG); Liyong Lin, Singapore (SG); Rong Su, Singapore (SG)

(73) Assignee: Delta Electronics Int'l (Singapore) Pte Ltd, Singapore (SG)

( * ) Notice: Subject to any disclaimer, the term of this patent is extended or adjusted under 35 U.S.C. 154(b) by 0 days.

(21) Appl. No.: 18/381,056

(22) Filed: Oct. 17, 2023

(65) Prior Publication Data

US 2024/0045444 A1 Feb. 8, 2024

Related U.S. Application Data

(62) Division of application No. 17/020,515, filed on Sep. 14, 2020, now Pat. No. 11,829,157.

(30) Foreign Application Priority Data

Dec. 31, 2019 (SG) .............................. 10201914066T

(51) Int. Cl.
*G05D 1/00* (2024.01)
*B60L 53/12* (2019.01)
(Continued)

(52) U.S. Cl.
CPC ............ *G05D 1/0287* (2013.01); *B60L 53/12* (2019.02); *B60L 53/36* (2019.02); *B60L 58/12* (2019.02);
(Continued)

(58) Field of Classification Search
CPC .. G05D 1/0287; G05D 1/0088; G05D 1/0217; G05D 1/0225; G05D 1/0297;
(Continued)

(56) References Cited

U.S. PATENT DOCUMENTS 5,023,790 A 6/1991 Luke, Jr.
8,681,179 B2 3/2014 Rolleston et al.
(Continued)

FOREIGN PATENT DOCUMENTS

CN 103782246 A 5/2014
CN 108898345 A 11/2018
(Continued)

OTHER PUBLICATIONS

English translation of CN-110103769-A (Year: 2024).*

*Primary Examiner* — Jess Whittington
*Assistant Examiner* — Shahira Baajour
(74) *Attorney, Agent, or Firm* — KIRTON McCONKIE; Evan R. Witt

(57) ABSTRACT

An automated guided vehicle (AGV) management system including a battery recharge management module, a task management module, and an AGV path planning module is provided. The battery recharge management module manages the AGVs to be recharged by at least one wireless charging unit in a parking area. The AGV leaving the parking area has a battery charge higher than a charge threshold. The task management module receives tasks and assigns the tasks to the AGVs. The task includes information including at least one pick-up location, at least one drop-off location, and a due time. The AGV path planning module plans paths for the AGVs, respectively, according to the information of the assigned tasks. The task management
(Continued)

module delays assigning the task to the AGV if the AGV is expected to complete the task earlier than the due time of the task.

11 Claims, 6 Drawing Sheets

(51) Int. Cl.
    *B60L 53/36*     (2019.01)
    *B60L 58/12*     (2019.01)
    *G01C 21/20*     (2006.01)

(52) U.S. Cl.
    CPC ......... *G01C 21/206* (2013.01); *G05D 1/0088* (2013.01); *G05D 1/0217* (2013.01); *G05D 1/0225* (2013.01)

(58) Field of Classification Search
    CPC .......... B60L 53/12; B60L 53/36; B60L 58/12; B60L 2240/72; B60L 2260/32; G01C 21/206; G01C 21/3407; Y02T 10/70; Y02T 10/7072; Y02T 10/72; Y02T 90/12; Y02T 90/14; Y02T 90/16; G06Q 10/0631; G06Q 10/06312; G06Q 50/04; H02J 7/0013; H02J 50/00

See application file for complete search history.

(56) References Cited

U.S. PATENT DOCUMENTS

| | | | |
|---|---|---|---|
| 10,089,586 | B2 | 10/2018 | Vestal et al. |
| 10,162,401 | B1* | 12/2018 | Brys ................... G01R 31/3842 |
| 2008/0051984 | A1* | 2/2008 | Wurman ................... G05D 3/00 |
| | | | 701/532 |
| 2015/0258910 | A1 | 9/2015 | Fukui et al. |
| 2016/0300178 | A1 | 10/2016 | Perry et al. |
| 2016/0307448 | A1* | 10/2016 | Salnikov ................ A01B 79/02 |
| 2018/0276604 | A1 | 9/2018 | Gariepy et al. |

FOREIGN PATENT DOCUMENTS

| | | |
|---|---|---|
| CN | 108952272 A | 12/2018 |
| CN | 109669456 A | 4/2019 |
| CN | 110103769 A | 8/2019 |
| CN | 110154816 A | 8/2019 |
| GB | 2581789 A | 9/2020 |
| SG | 173002 A1 | 8/2011 |
| TW | M570304 U | 11/2018 |

* cited by examiner

AUTOMATED GUIDED VEHICLE MANAGEMENT SYSTEM AND METHOD

CROSS-REFERENCE TO RELATED APPLICATION

This application is a divisional application of U.S. application Ser. No. 17/020,515 filed on Sep. 14, 2020 and entitled "AUTOMATED GUIDED VEHICLE MANAGEMENT SYSTEM AND METHOD", which claims priority to Singapore Patent Application No. 10201914066T, filed on Dec. 31, 2019. The entire contents of the above-mentioned patent applications are incorporated herein by reference for all purposes.

FIELD OF THE INVENTION

The present disclosure relates to automated guided vehicle (AGV) management, and more particularly to an automated guided vehicle management system and a method thereof.

BACKGROUND OF THE INVENTION

As the manufacturing industry is moving fast into the Industry 4.0 age, there is an ever-growing demand for increasing the level of automaton in the factory setting. These factory systems need to be more efficient, robust against environment uncertainty and cost effective. Raw materials and products need to be automatically transported using an efficiently coordinated fleet of AGVs. These AGVs need to ensure continual operation despite of insufficient battery charge. There is often a stringent deadline to meet, and the demand is largely unpredictable. It is thus of great interest to improve the operational efficiency of the AGV management system by optimizing the path planning, task assignment, battery recharge management and so on.

Existing warehouse automation solutions have addressed the problem of efficiently coordinating the paths of a plurality of AGVs as well as the problems of task assignment, battery recharge management, and task generation. While U.S. Patent Application Publication No. 2018/0276604 addresses just-in-time process, the method for autonomous provision replenishment is inflexible as it attempts to maintain a small queue of parts as stocks. Moreover, it achieves just-in-time process by solving the task generation problem, i.e., considering when a delivery task shall be generated, instead of task assignment, i.e., considering when a generated delivery task shall be assigned. In particular, once a task is generated, it will be assigned immediately. The battery recharge management method in U.S. Pat. No. 10,089,586 is not flexible and involves only static charging policy, i.e., AGV is released from charging when it has sufficient battery determined by a constant. There are many aspects of these systems that need further optimization and are not well addressed in the previous works. For example, the existing solutions typically perform immediate task assignment decisions whenever new tasks are generated. This may unnecessarily waste precious AGV resources if an AGV is assigned to a task too early, which may later turn out to be less urgent than newly generated tasks. It is thus advantageous to adopt just-in-time task assignment strategy, which has not been considered before.

Therefore, there is a need of providing an AGV management system and method to obviate the drawbacks encountered from the prior arts.

SUMMARY OF THE INVENTION

It is an objective of the present disclosure to provide an AGV management system and method. In accordance with the energy, delivery time, and deadline analysis, the AGV management system and method ensure that idle AGVs with more battery charge have higher priority of getting assigned tasks and ensure just-in-time task assignment. Just-in-time process is achieved by task assignment instead of task generation. In addition, the AGV management system and method allow dynamic charging policy for the AGVs and ensure the AGV leaving the parking area has at least enough battery charge to carry out a useful task. Moreover, the paths of AGVs are coordinated to reduce bottleneck, minimize the transit time, and handle environmental uncertainty.

In accordance with an aspect of the present disclosure, there is provided an automated guided vehicle (AGV) management system. The AGV management system includes a battery recharge management module, a task management module, and an AGV path planning module. The battery recharge management module is configured for managing a plurality of AGVs to be recharged by at least one wireless charging unit in a parking area. The battery recharge management module is adapted to ensure that the AGV leaving the parking area has a battery charge higher than a charge threshold. The task management module is configured for receiving tasks and assigning the tasks to the AGVs. The task includes information including at least one pick-up location, at least one drop-off location, a destination, and a due time. The AGV path planning module is configured for planning paths for the AGVs, respectively, according to the information of the assigned tasks. The task management module is configured to delay assigning the task to the AGV if the AGV is expected to complete the task earlier than the due time of the task.

In accordance with another aspect of the present disclosure, there is provided an automated guided vehicle (AGV) management method. The AGV management method includes steps: (a) managing a plurality of AGVs to be recharged by at least one wireless charging unit in a parking area for ensuring that the AGV leaving the parking area has a battery charge higher than a charge threshold; (b) receiving tasks, wherein the task includes information including at least one pick-up location, at least one drop-off location, a destination, and a due time; (c) assigning the tasks to the AGVs tentatively; (d) planning paths for the assigned AGVs, respectively, according to the information of the assigned tasks; (e) examining whether the assigned AGV's battery is sufficient to carry out the task, wherein if the examining result is satisfied, the succeeding step is performed, and if the examining result is not satisfied, the assigned AGV is recharged, and the step (c) is repeated; (f) delaying assigning the task to the AGV if the AGV is expected to complete the task earlier than the due time of the task; and (g) controlling the assigned AGV to arrive at the destination at the due time.

DETAILED DESCRIPTION OF THE PREFERRED EMBODIMENT

Figure 1:
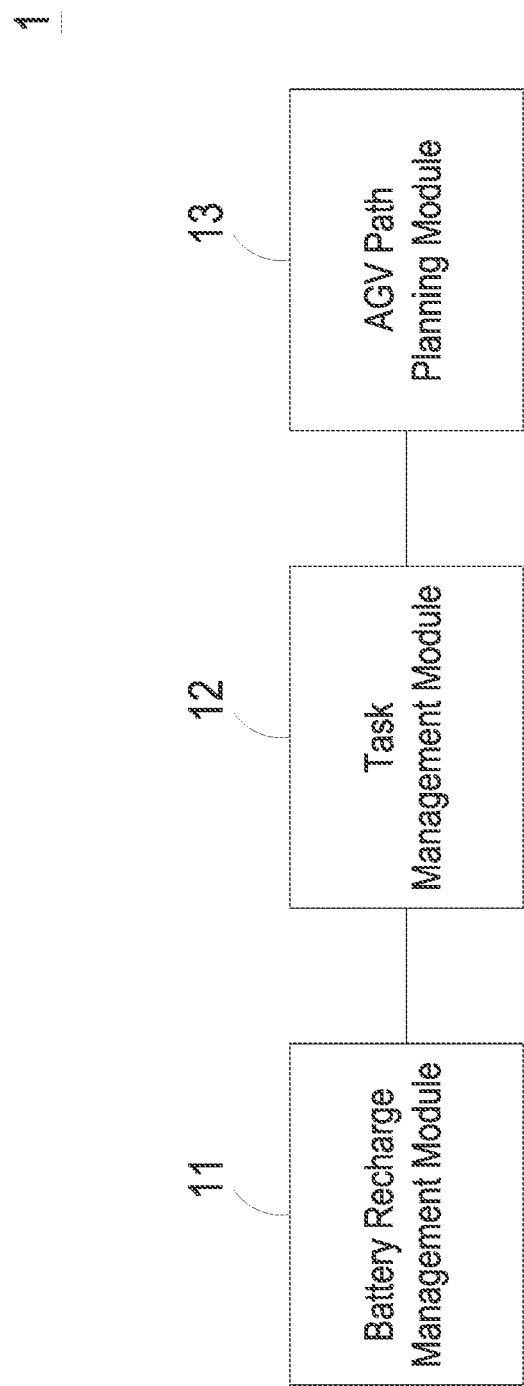
FIG. 1 is a schematic diagram illustrating an automated guided vehicle (AGV) management system of an embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items. While the numerical ranges and parameters set forth for the broad scope of the present invention are approximations, the numerical value reported in the specific examples set forth as accurately as possible. However, any numerical values inherently contain certain errors necessarily the standard deviation found in the respective testing measurements caused. Also, as used herein, the term "about" generally means away from a given value or a range of 10%, 5%, 1% or 0.5%. Alternatively, the word "about" means within an acceptable standard error of ordinary skill in the art-recognized average. In addition to the operation/working examples, or unless otherwise specifically stated otherwise, in all cases, all of the numerical ranges, amounts, values and percentages, such as the number for the herein disclosed materials, time duration, temperature, operating conditions, the ratio of the amount, and the like, should be understood as the word "about" decorator. Accordingly, unless otherwise indicated, the numerical parameters of the present invention and scope of the appended patent proposed is to follow changes in the desired approximations. At least, the number of significant digits for each numerical parameter should at least be reported and explained by conventional rounding technique is applied. Herein, it can be expressed as a range between from one endpoint to the other or both endpoints. Unless otherwise specified, all ranges disclosed herein are inclusive.

FIG. 1 is a schematic diagram illustrating an automated guided vehicle (AGV) management system of an embodiment of the present disclosure. As shown in FIG. 1, the AGV management system 1 includes a battery recharge management module 11, a task management module 12, and an AGV path planning module 13. The battery recharge management module 11 is configured for managing a plurality of AGVs to be recharged by at least one wireless charging unit in a parking area. The battery recharge management module 11 is adapted to ensure that the AGV leaving the parking area has a battery charge higher than a charge threshold. The task management module 12 is configured for receiving tasks and assigning the tasks to the AGVs. The task includes information including at least one pick-up location, at least one drop-off location, a destination, and a due time. The AGV path planning module 13 is configured for planning paths for the AGVs, respectively, according to the information of the assigned tasks. The task management module 12 is configured to delay assigning the task to the AGV if the AGV is expected to complete the task earlier than the due time of the task. The task management module 12 and the battery recharge management module 11 may provide destinations for the AGVs if the tasks are assigned or the battery of the AGV needs to get recharged, and then the routes to the destinations are planned with the AGV path planning module 13. As the AGVs move around, the battery levels get updated (decrement if in movement, increment if under charging) and the assigned task lists also get updated (after loading or unloading).

In an embodiment, the battery recharge management module 11 works in two modes. In the first mode, each AGV has a dedicated wireless charging unit in the parking area. The AGVs are charged while being parked, and no additional charging logic is required. In the second mode, the number of the wireless charging units in the parking area is less than the number of the AGVs. In this circumstance, the AGVs may share the wireless charging units in the parking area. In detail, the battery recharge management module 11 loops over every wireless charging unit in the parking area, and each of which determines the unassigned AGV with the least battery charge. If the wireless charging unit under examination is currently free, then the determined AGV is assigned to this wireless charging unit in the parking area.

Otherwise, the battery recharge management module 11 reassigns a new AGV to this wireless charging unit in the parking area if the following two requirements are satisfied. The first requirement is that the battery charge of the current AGV is more than the charge threshold, which ensures that the AGV leaving the parking area has at least enough battery charge to carry out a useful task. The second requirement is that the battery charge of the current AGV is more than a sum of the battery charge of the new AGV and a preset charge value, which ensures that time and battery charge will not be wasted in shuffling different AGVs in and out of the same wireless charging unit in the parking area.

In an embodiment, the task management module 12 keeps track of all the tasks and assigns the tasks to the AGVs that are free. The task management module 12 assigns a task to the AGV, which is free and capable of carrying out the task with the earliest delivery time, and the AGV with the higher battery charge is given the higher priority in task assignment. Moreover, the task management module 12 determines whether the AGV would arrive at the destination earlier than the due time. If so, the task management module 12 delays assigning the task to the AGV to ensure just-in-time assignment. Once the task is assigned, the task management module 12 assigns additional tasks requiring delivery to nearby locations to the same AGV in the same trip. Furthermore, the task management module 12 estimates the required energy usage for the AGV to carry out the assigned tasks. If the battery charge of the AGV is greater than the sum of the energy to be spent in the trip and a predefined energy reserve, then the tasks are assigned to the AGV, and no further change may be made to the list of tasks until the assigned tasks are completed. Otherwise, the assignment is delayed. Consequently, in accordance with the energy, delivery time, and deadline analysis, the task management module 12 is adapted to ensure that idle AGVs with more battery charge have higher priority of getting assigned tasks and ensures just-in-time task assignment. Just-in-time process is achieved by task assignment instead of task generation.

In an embodiment, according to the information including the pick-up location and the drop-off location of the tasks, the assigned AGV visits the locations in order to pick up and drop off the target. The AGV path planning module 13 plans a path of taking the AGV through the given sequence of the pick-up and drop-off locations in order. For ensuring that the AGVs effectively and efficiently coordinate their path with one another under environmental uncertainty, the AGV path planning module 13 utilizes A* algorithm for path planning with a hybrid receding horizon/incremental scheduling strategy that carries out online replanning. In one embodiment, the path of each AGV is replanned after every x time units, and the trajectories of all other AGVs over the next y time units are taken into account while replanning the path (where y>x). Namely, the other AGVs are treated as moving obstacles with known trajectories, and the AGV path planning module 13 incrementally calculates the path of the current AGV by taking the trajectories of the other AGVs into consideration. In addition, while replanning the path, the non-AGV obstacles may be introduced as well. The incremental scheduling is flexible and allows an AGV with lower priority to delay the schedules of AGVs with higher priorities, and the receding horizon scheduling ensure robustness of the collision avoidance property and time optimality against environment uncertainty.

Figure 2:
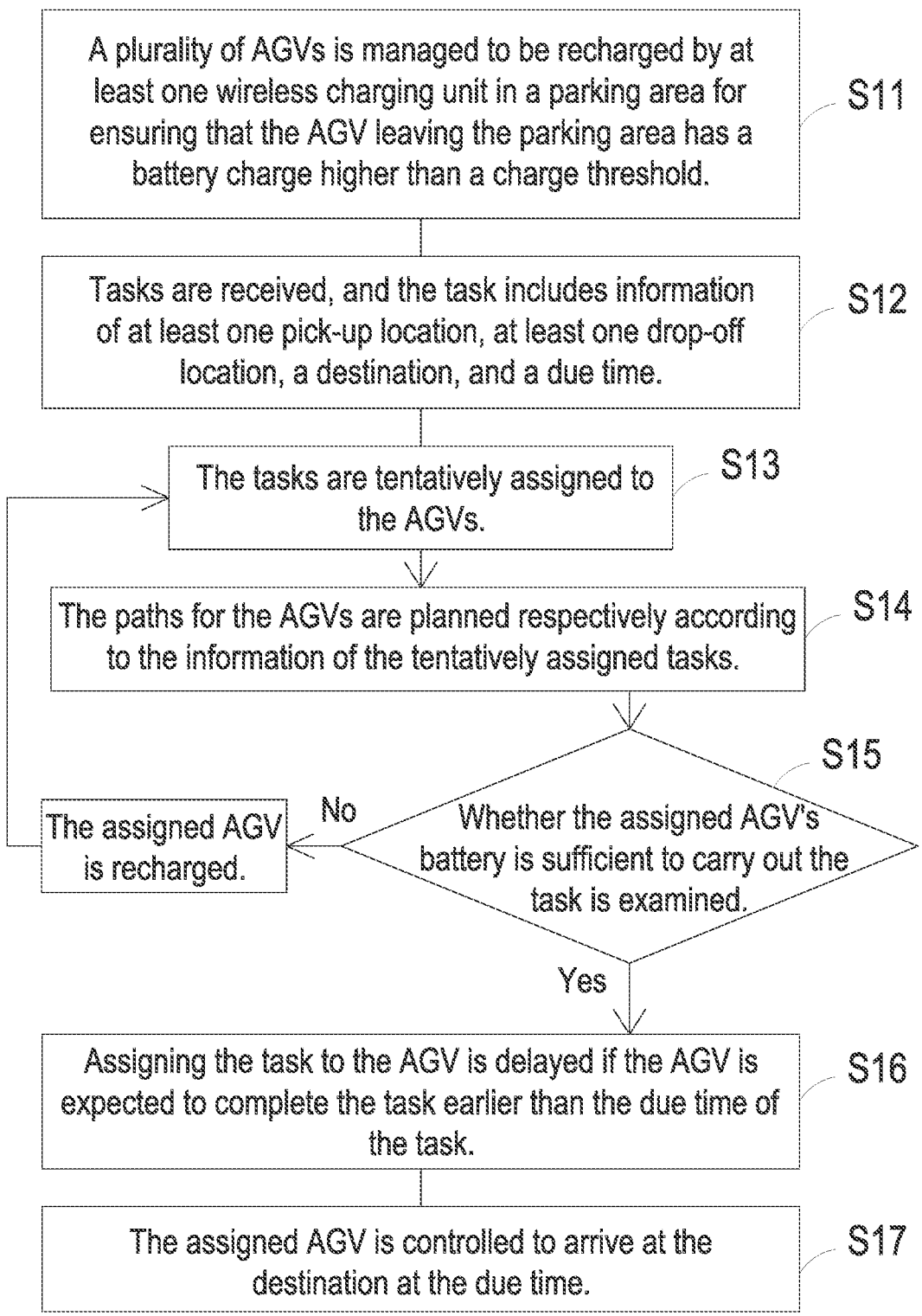
FIG. 2 is a flowchart illustrating the AGV management method of an embodiment of the present disclosure.

FIG. 2 is a flowchart illustrating an AGV management method of an embodiment of the present disclosure. As shown in FIG. 2, the AGV management method includes the following steps.

In step S11, a plurality of AGVs is managed to be recharged by at least one wireless charging unit in a parking area for ensuring that the AGV leaving the parking area has a battery charge higher than a charge threshold.

In step S12, tasks are received, and the task includes information including at least one pick-up location, at least one drop-off location, a destination, and a due time.

In step S13, the tasks are tentatively assigned to the AGVs.

In step S14, the paths for the AGVs are planned respectively according to the information of the tentatively assigned tasks.

In step S15, whether the assigned AGV's battery is sufficient to carry out the task is examined. If the examining result is satisfied, the succeeding step is performed. If the examining result is not satisfied, the assigned AGV is recharged in the parking area, and the step S13 is repeated.

In step S16, assigning the task to the AGV is delayed if the AGV is expected to complete the task earlier than the due time of the task.

In step S17, the assigned AGV is controlled to arrive at the destination at the due time.

In an embodiment, the step S15 further includes a step of examining whether a predetermined remaining battery of the assigned AGV may be ensured once the assignment is done. If the examining result is satisfied, the succeeding step is performed. If the examining result is not satisfied, the assigned AGV is recharged in the parking area, and the step S13 is repeated.

Figure 3:
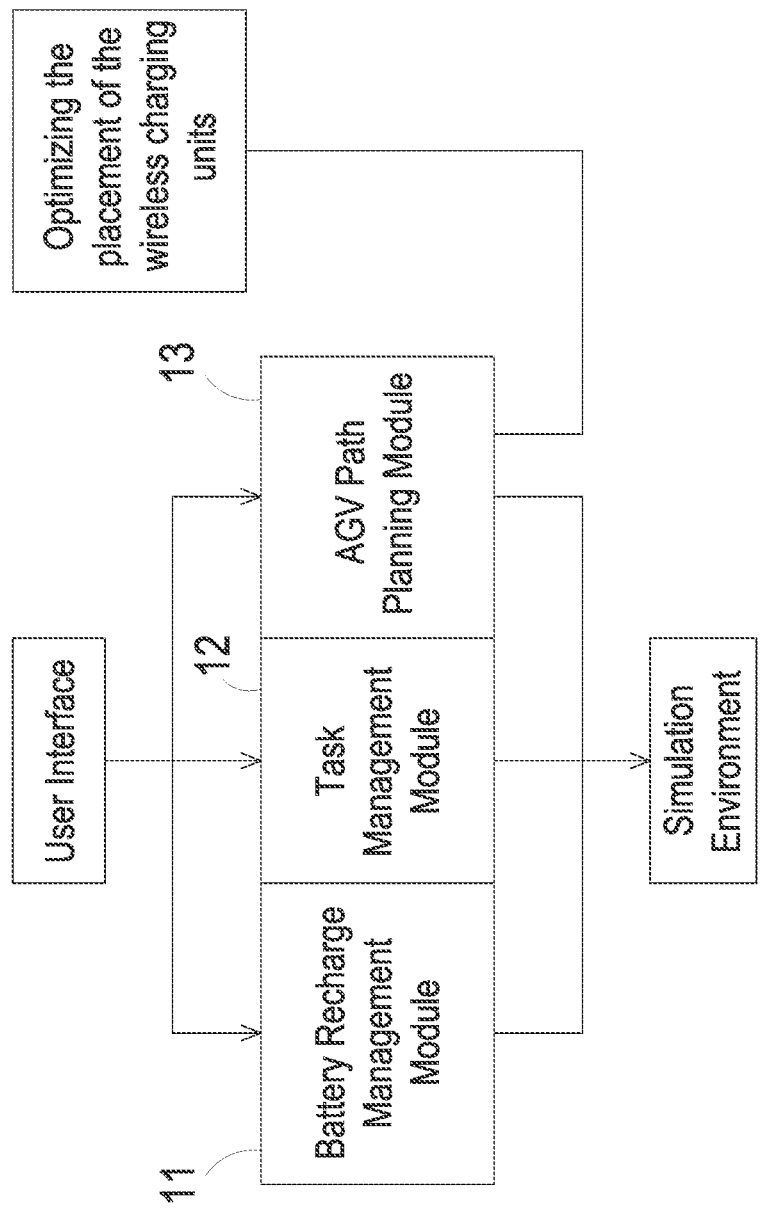
FIG. 3 schematically illustrates the software architecture for the AGV management system with a method for optimizing placement of wireless charging units.

Please refer to FIG. 3. FIG. 3 schematically illustrates the software architecture for the AGV management system with a method for optimizing placement of wireless charging units. Users provide the area layout (e.g., factory layout), tasks and simulation parameters and options through the user interface, and the data provided are taken as input for the modules in the AGV management system 1. The AGV management system 1 outputs the coordinated paths for the AGVs considering the battery charge and respecting the assigned tasks. The paths for the AGVs are used for optimizing the placement of the wireless charging units.

It is noted that the wireless charging units include the wireless charging unit in the parking area and the on-the-go wireless charging unit. The on-the-go wireless charging unit is capable of charging the battery of any AGV directly above the on-the-go wireless charging unit, even when the AGV is moving. Therefore, the on-the-go wireless charging unit may reduce or even potentially eliminate the delays due to battery recharge by charging the moving AGVs.

Figure 4:
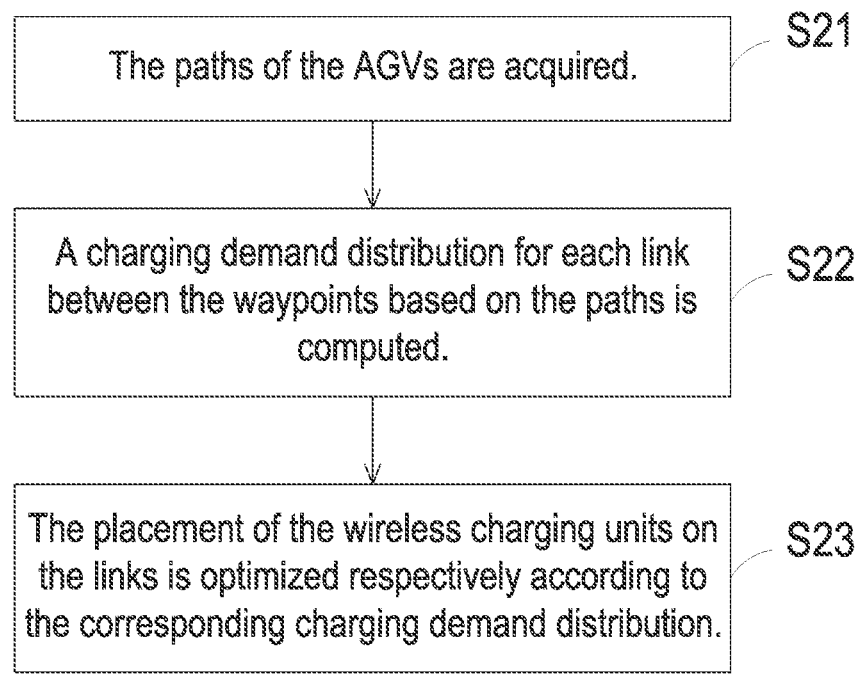
FIG. 4 is a flowchart illustrating a method for optimizing the placement of the wireless charging unit of an embodiment of the present disclosure.

FIG. 4 is a flowchart illustrating a method for optimizing the placement of the wireless charging unit of an embodiment of the present disclosure. As shown in FIG. 4, the method for optimizing the placement of the wireless charging units includes the following steps.

In step S21, the paths of the AGVs are acquired.

In step S22, a charging demand distribution for each link between the waypoints based on the paths is computed.

In step S23, the placement of the wireless charging units on the links is optimized respectively according to the corresponding charging demand distribution. Fractions of the links being occupied by the on-the-go wireless charging units are determined according to the charging demand distribution.

In order to determine an optimal placement of on-the-go wireless charging units, we acquire a representative sequence of movements of AGVs, assuming the AGVs have infinite battery charge. This data may be acquired via simulation, or by looking at AGVs' movements for current real-world operation. From this sequence of movements, a mixed integer linear programming (MILP) problem is formulated. The MILP problem is used to calculate the minimum amount of budget required for installing the on-the-go wireless charging units and an optimal placement of on-the-go wireless charging units, and each AGV's battery charge may never go below a certain threshold value. Variants of this problem, which are also formulated as MILP problems, are used to minimize the amount of delay due to battery recharge, assuming only a fixed amount of budget is available for installing the on-the-go wireless charging units.

In one embodiment, the steps of the method for optimizing the placement of the wireless charging units are repeatable, and the steps are repeated when the operation environment or requirement of the automated guided vehicle is changed.

Figure 5:
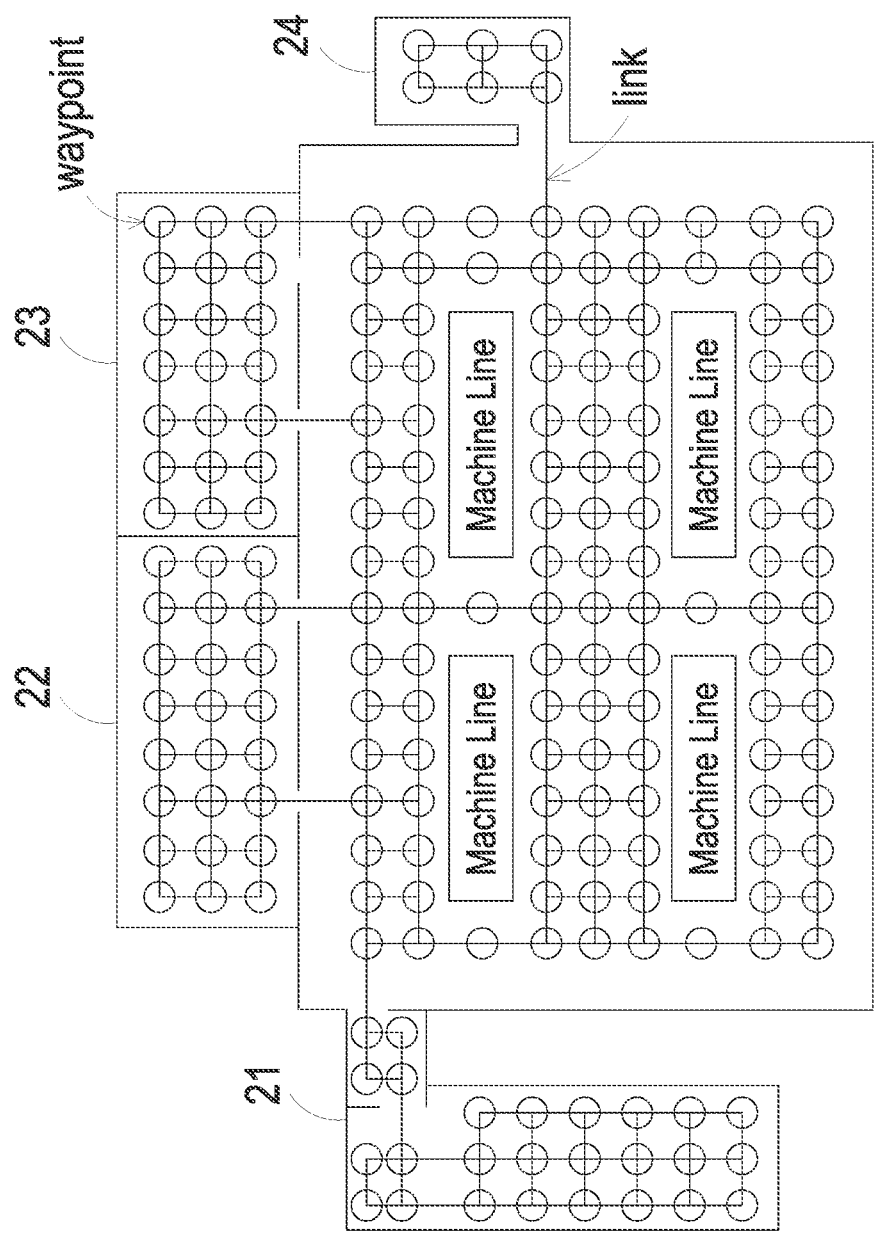
FIG. 5 is a schematic view showing a factory environment for printed circuit board production.

Taking the AGVs utilized in a factory as an example, FIG. 5 shows a factory environment for PCB (printed circuit board) production. As shown in FIG. 5, the first chamber 21, the second chamber 22, the third chamber 23, and the fourth chamber 24 are used for storing stencil units, component stored units, processed PCBs, and fresh PCBs respectively. For example, the component stored unit may be a component tape reel or a bin adapted to accommodate plural component tape reels. The AGVs are required to transport fresh PCBs to the load ports of the machine lines and swap old component stored units and stencils with new ones for the machine lines to process the fresh PCBs. After the PCBs get processed, the AGVs pick up the processed PCBs from the unload ports of the machine lines and transport them to the third chamber for storage. In each chamber, there are dedicated parking areas for the AGVs, and there is a unique port for the AGV to load and/or unload. In particular, the unique ports in the first and second chambers 21, 22 are used for loading and unloading stencil units and component stored units respectively, the unique port in the third chamber 23 is used for unloading processed PCBs, and the unique port in the fourth chamber 24 is used for loading fresh PCBs. For each machine line, it may require multiple load ports for stencil units and/or component stored units. Each AGV may have a fixed type and transport a particular type of objects, and each AGV may be allowed to carry more than one object at the same time.

Please refer to FIG. 3 and FIG. 5. The user interface may allow the user to draw the factory layout with waypoints, links, AGVs, wireless charging units, load ports, machine lines, and static obstacles. The boundaries of the factory layout and the machine lines are static obstacles, which may be added to the factory layout and resized according to the needs of the user. The factory layout with waypoints and links shown in FIG. 5 is drawn using the user interface.

There are three modes for the user to interact with the simulation environment and assign tasks to the AGV management system 1. In the first mode, the user may manually assign tasks to different machine lines before the computation and simulation starts. Alternatively, in the second mode, the user may randomly assign tasks to different machine lines. After the tasks are assigned, the path planning and simulation starts, where the battery charge is assumed to be infinite. The software will also provide some statistics to indicate the performance of the path planning process, including the computation time, the amount of time for the tasks to be completed, lower bound estimate on the amount of time for the tasks to be completed and so on. In the third mode, the user selects the receding horizon/incremental scheduling approach and the prioritized planning approach, and the user may dynamically assign tasks to different machine lines when the simulation is running. When the user selects the receding horizon/incremental scheduling approach, the user may also dynamically add obstacles and remove obstacles. The software modules would perform replanning in real-time to avoid collision of AGVs with obstacles. In the third mode, the user may track the battery level and the planned path for each AGV, as well as the statistics for the loading and unloading tasks, including the AGV assigned, time fulfilled, time to complete, average delivery time and so on. In addition, in the third mode, the user may also randomly assign tasks to different machine lines. The rate for task generation is determined by the certain simulation parameter.

The performance comparison between the factory environment with and without optimally placed on-the-go wireless charging units, during an experiment of five wall-clock minutes, is shown in Table 1. Under a random assignment of tasks with the same parameters, the average delivery time and the average battery every one minute are compared.

TABLE 1

| Wall-clock Time | 1 min | 2 min | 3 min | 4 min | 5 min |
| --- | --- | --- | --- | --- | --- |
| Average Delivery Time [minutes:seconds] (without optimization→ with optimization) | (05:54→05:48) | (08:54→07:33) | (11:20→09:14) | (14:18→11:07) | (16:54→12:57) |
| Average Battery (%) (without optimization→ with optimization) | (43.3→82.7) | (27.3→70.2) | (29.7→60.7) | (29.5→58.8) | (33.3→59) |

In the Table 1, the data for the setup without optimally placed on-the-go wireless charging units are shown as the first tuple (without optimization), while the data for the setup with optimally placed on-the-go wireless charging units are shown as the second tuple (our method). We can observe that the average delivery time difference between the two setups grows linearly. Thus, the performance degradation, and thus factory delay, due to insufficient battery charge is much smaller in the setup with optimally placed on-the-go wireless charging units. The performance difference becomes more significant, especially in the long run, and thus we can conclude that the factor delay due to charging has been significantly reduced in the setup with optimally placed on-the-go wireless charging units. We can observe that the average battery is consistently much higher in the setup with optimally placed on-the-go wireless charging units.

The AGV management system and the method for optimizing the placement of the wireless charging unit are introduced in the factory setup as an example, but they are also equally applicable to similar setups such as warehouse and logistics.

Figure 6:
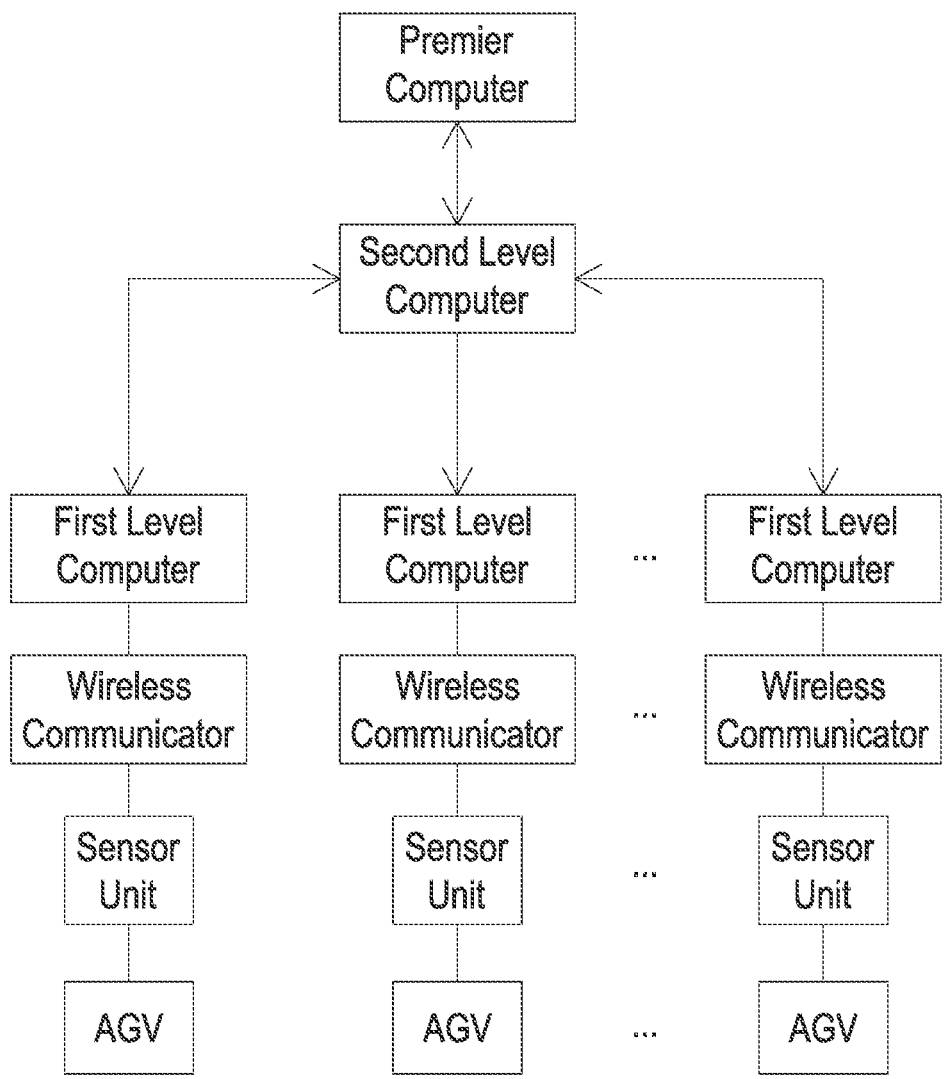
FIG. 6 is a schematic diagram illustrating a logistic automation framework of an embodiment of the present disclosure.

FIG. 6 is a schematic diagram illustrating a logistic automation framework of an embodiment of the present disclosure. As shown in FIG. 6, the logistic automation framework includes a plurality of AGVs, a plurality of universal sensor units, an anti-interference wireless communicator, a plurality of first level computers a second level computer. The AGVs have different types with different functions, such as forklifting, towing, material handling or any other transportation function. The universal sensor units collect and locally process the environmental information, providing perception, planning and motion control to the different AGVs. The sensor unit is for example but not limited to a Truepath Kit. The anti-interference wireless communicator is integrated to the universal sensor units and transmits events generated after locally processed by the universal sensor units. In an embodiment, the anti-interference wireless communicator transmits wirelessly in range longer than standard Wi-Fi a/b/g/n protocol. The first level computer is configured for data acquisition and bandwidth management and is together with user interface (e.g., mobile platform user interface) for the AGV management system 1. The first level computer processes the received data from the universal sensor units and sends only event to the second level computer. On the other hand, the first level computer sends the control command from the second level computer to the universal sensor units. The first level computer is for example but not limited to aggregator. The second level computer acts as the proxy of the premier server and is together with user interface (e.g., mobile platform user interface) for the AGV management system 1. In an embodiment, the universal sensor unit, the first level computer, and the second level computer may be connected to a data base.

The universal sensor units collect real time data on AGVs and send the data to the first level computers. After processing the data from the universal sensor units, the first level computers send the data to the second level computer, where the AGV management system software resides. On the other hand, the AGV management system software publishes control commands to the first level computers. The first level computers then pass commands to the universal sensor units. Several software modules are integrated into the AGV management system software, such as the software modules of the above-mentioned battery recharge management module 11, task management module 12, and AGV path planning module 13.

From the above descriptions, the present disclosure provides an AGV management system and method. In accordance with the energy, delivery time, and deadline analysis, the AGV management system and method ensure that idle AGVs with more battery charge have higher priority of getting assigned tasks and ensure just-in-time task assignment. Just-in-time process is achieved by task assignment instead of task generation. In addition, the AGV management system and method allow dynamic charging policy for the AGVs and ensure the AGV leaving the parking area at least enough battery charge to carry out a useful task. Moreover, the paths of AGVs are coordinated to reduce bottleneck, minimize the transit time and handle environmental uncertainty.

While the disclosure has been described in terms of what is presently considered to be the most practical and preferred embodiments, it is to be understood that the disclosure needs not be limited to the disclosed embodiment.

What is claimed is:

1. An automated guided vehicle (AGV) management system, comprising:
    a battery recharge management controller configured for managing a plurality of AGVs to be recharged by at least one wireless charging unit in a parking area, wherein the battery recharge management controller is adapted to ensure that any of the plurality of AGVs leaving the parking area has a battery charge higher than a charge threshold;
    a task management controller configured for receiving tasks and assigning the tasks to the plurality of AGVs, wherein each of the tasks comprises information including at least one pick-up location, at least one drop-off location, a destination and a due time, wherein the due time of a task is a time for completing the task; and
    an AGV path planning controller configured for planning paths for the plurality of AGVs, respectively, according to the information of the tasks,
    wherein the task management controller is further configured to examine whether a battery charge of an AGV of the plurality of AGVs is sufficient to carry out a task among the tasks, and if the battery charge of the AGV is sufficient to carry out the task, delay assigning the task to the AGV when the AGV is expected to complete the task earlier than the due time of the task, and if the battery charge of the AGV is not sufficient to carry out the task, assign the AGV to be recharged and assign the task to another AGV of the plurality of AGVs; and
    wherein if a battery charge of a first AGV among the plurality of AGVs, which is currently recharged by the at least one wireless charging unit, is more than 1) the charge threshold and 2) a sum of a preset charge value and a battery charge of a second AGV among the plurality of AGVs, which is not currently recharged by the at least one wireless charging unit, the battery recharge management controller is further configured to assign the second AGV to be recharged by the at least one wireless charging unit in replace of the first AGV.

2. The automated guided vehicle management system according to claim 1, wherein the battery recharge management controller assigns an AGV, among the plurality of AGVs, which has a battery charge lower than a battery charge of any other AGV among the plurality of AGVs to the at least one wireless charging unit.

3. The automated guided vehicle management system according to claim 1, wherein the task management controller assigns additional tasks to the AGV if the AGV is expected to complete the task earlier than the due time of the task.

4. The automated guided vehicle management system according to claim 1, wherein the battery recharge management controller is configured to operate in at least two working modes,
    wherein in a first working mode of the at least two working modes, each AGV of the plurality of AGVs are assigned with a dedicated wireless charging unit among the at least one wireless charging unit in the parking area, and in a second working mode of the at least two working modes, a number of the plurality of AGVs is larger than a number of the at least one wireless charging unit, and the number of the plurality of AGVs share the wireless charging units in the parking area.

5. The automated guided vehicle management system according to claim 1, wherein when the task management controller assigns the tasks to the plurality of AGVs, an AGV with a higher battery charge among the plurality of AGVs is given a higher priority in task assignment.

6. The automated guided vehicle management system according to claim 1, wherein the AGV path planning controller utilizes A* algorithm for planning the paths.

7. The automated guided vehicle management system according to claim 1, wherein the AGV path planning controller plans the paths with a hybrid receding horizon/incremental scheduling strategy that carries out online replanning.

8. The automated guided vehicle management system according to claim 1, wherein the AGV path planning controller replans the path of an AGV, among the plurality of AGVs every x time units with reference to trajectories of all other AGVs, among the plurality of AGVs, over next y time units when replanning the path of the AGV, and y is greater than x.

9. The automated guided vehicle management system according to claim 1, further comprising a user interface unit configured for receiving at least input information corresponding to the plurality of AGVs and the at least one wireless charging unit, the tasks, the at least one pick-up location, and the at least one drop-off location.

10. The automated guided vehicle management system according to claim 9, wherein the user interface unit is further configured for receiving assignments of the tasks and scheduling approaches of the path planning, wherein the scheduling approaches comprise a receding horizon/incremental scheduling approach.

11. The automated guided vehicle management system according to claim 10, wherein the AGV path planning controller is configured for planning paths according to the scheduling approaches.

* * * * *